Sept. 27, 1932.   H. T. SEELEY   1,879,545
ELECTRICAL CONTROL SYSTEM
Filed Jan. 5, 1929

Inventor:
Harold T. Seeley,
by Charles E. Tulla
His Attorney.

Patented Sept. 27, 1932

1,879,545

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

ELECTRICAL CONTROL SYSTEM

Application filed January 5, 1929. Serial No. 330,650.

My invention relates to electrical control systems and more particularly to electrical control systems in which an electric motor is employed to operate a remotely located device and has for its object the provision of a simple, inexpensive and efficient electrical control system of this character.

Although my invention is not necessarily limited thereto, it has a particular application in the electrical control of valves, water gates and like apparatus.

Large valves, as for instance, those employed to control the flow of fluid through large steam, gas, or water mains, and also water gates and like apparatus, are usually power operated since such operation is conducive to efficiency and economy of time.

It will be understood, however, that oftentimes very large frictional forces occur when a large valve is operated because of the very large pressure differential that may exist across the valve. Thus by reason of these large frictional forces, not only is the valve structure subjected to excessive strains and wearing forces but also a relatively large motor is required to operate the valve.

In one of its aspects, therefore, my invention contemplates the provision of an electrical control system for a valve or like apparatus whereby the forces required to actuate the valve will be reduced greatly with the result that a much smaller operating motor may be satisfactorily employed.

In carrying my invention into effect in one form thereof, I provide an electric motor for operating the valve and control the motor responsively to a predetermined condition of the fluid being controlled so that the motor will not be energized to open the valve until the pressure differential across the valve has been greatly reduced. Preferably, I provide a fluid by-pass around the valve and control this fluid by-pass by a second motor operated valve. In opening the main valve, the second motor will first be energized so as to open the fluid by-pass and thereby reduce the pressure differential across the main valve to a predetermined desired value after which the main motor will be energized so as to open the main valve. Preferably, in closing, I cause the main valve to close first and energize the auxiliary motor to close the by-pass valve responsively to the closing of the main valve.

Figure 1:
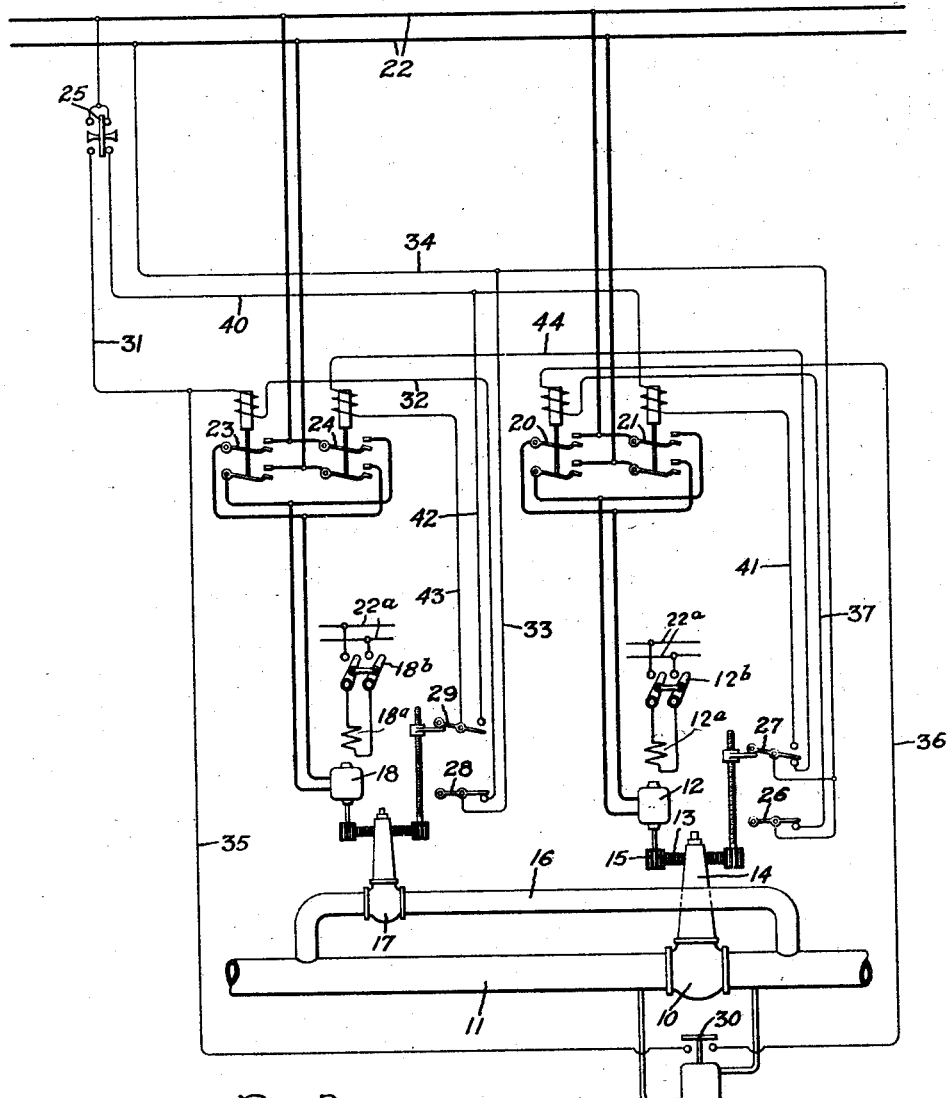
Figure 2:
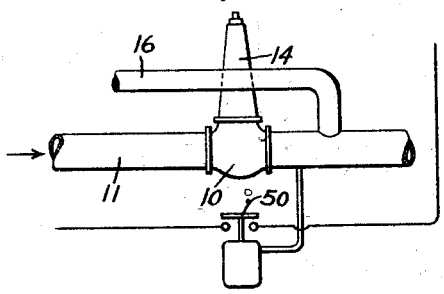

For a more complete understanding of my invention, reference should be had to the accompanying drawing in which Fig. 1 illustrates in diagrammatical form a system of electrical control embodying my invention, the system being arranged to control the flow of a fluid in either direction; and Fig. 2 illustrates a similar electrical control system as embodied in those systems in which the direction of flow is always the same.

Referring to the drawing, I have shown my invention in one form in connection with a remotely located motor operated valve, the valve being provided with a suitable fluid by-pass so that the pressure differential across the valve may be reduced to a suitable value before it is opened. The valve 10, which is provided to control the flow of fluid through the main or conduit 11, will be mechanically connected with its operating motor 12 in any suitable manner. As shown suitable gearing is provided for this purpose. Thus, the gear 13 which will be located upon the upper portions of a suitable stanchion 14 of the valve 10, will be mechanically connected both with the valve spindle (by means not shown) and with the motor by means of the pinion 15. It will be understood that the valve 10 may be of any desired form, but preferably I will employ the usual gate valve in which the motion of the gate is transverse to the flow of the fluid through the main or conduit.

In order to suitably govern the pressure differential across the valve 10, I provide a suitable fluid by-pass 16 around the valve and control the flow of fluid through the by-pass by means of the auxiliary valve 17, which may be of any preferred construction. The valve 17 will be suitably operated to open and close by means of an operating motor 18 to which the valve will be mechanically connected in any desired manner. Preferably this mechanical connection will be substantially the same as that between the valve 10 and its operating motor 12.

It will be understood that the motors 12 and 18 will be provided with suitable reversing mechanism so that each motor may be operated to open or close its associated valve. It will also be understood that each motor will be provided with suitable limit switching mechanism so that it will be deenergized when its associated valve has been operated to its limit of motion in either direction. Thus, the motor 12 will be provided with suitable reversing switches 20 and 21 which will be interposed between the armature of the motor and a suitable source of electrical supply 22, the switch 20 being provided to energize the motor to open the valve and the switch 21 being provided to energize the motor so as to close the valve. Likewise, the motor 18 will be provided with a directional switch 23 which when closed will energize the motor to open its associated valve 17, and with a directional switch 24 which when closed will energize the motor to close its associated valve. All of these directional switches 20 and 21, and 23 and 24 will be under the control of a suitable remote master switch 25. This switch is shown as being of a push button type although any suitable switch may be used. It should be understood, however, that the switch will have two contact making positions and a neutral or open circuit position. It will be understood that the motors 12 and 18 may be either of the direct current or of the alternating current type.

Although the motor 12 may be of any suitable type it is illustrated as a separately excited direct current motor, i. e., it is provided with a field winding 12a which is arranged to be excited from any suitable direct current source of supply such for example as that represented in the drawing by the conductors 22a to which it is arranged to be connected by means of a suitable switch 12b. The source 22a may be and preferably is the same as the source 22. Likewise the motor 18 is provided with a field winding 18a which is arranged to be connected to the source 22a by means of a suitable switch 18b.

The motor 12 will be provided with limit switches 26 and 27, the switch 26 being provided for the open limit of motion of the valve 10, while the switch 27 will be provided for the closed limit of motion of this valve. Likewise, the motor 18 will be provided with the limit switches 28 and 29 which will serve to limit the operation of the motor for fully open and fully closed positions of the valve 17, respectively.

The control system for the motor further comprises suitable means for controlling the energization of the motor 12 responsively to a predetermined condition of the fluid being controlled so that this motor will not be energized to open the valve until the pressure differential has been reduced to the desired value. In those systems in which it is necessary to control the flow of the fluid in either direction, I provide a suitable pressure differential relay 30 (Fig. 1) for this purpose, the pressure relay being arranged to be operated to its closed position when the pressure differential has been reduced to the desired value. It is believed unnecessary for a proper understanding of this invention to describe in detail the construction of the pressure differential relay 30, it being understood that any relay which will so respond to the pressure differential may be employed.

The operation of the electrical control system is as follows: Let it be assumed that the valves 10 and 17 are in their closed position and that it be desired to open the valve 10 to permit the flow of fluid through the main 11, it being understood that this flow may be in either direction. In order to effect this operation of the valve 10, assuming the field switches 12b and 18b operated to their closed position the master switch 25 will be moved to its left hand position, as viewed in the figure. This operation of the master switch will effect an energization of the directional contactor 23 of the motor 18 by means of an energizing circuit which may be traced from the upper conductor of the supply source 22, through closed left hand contacts of the switch 25, the conductor 31, the operating coil of the contactor 23, the conductor 32, the closed limit switch 28, the conductor 33 and thence through the conductor 34 to the lower conductor of the supply source. As a result of this operation, the motor 18 will be energized to open its valve 17. It will be observed that as a result of this operation of the motor, the limit switch 29 will be operated to its closed position. This operation of the limit switch, however, will effect no resulting controlling action of the motors at this time since the circuit through this limit switch leads to the open right hand contacts on the master switch 25.

It will be observed that when the valve 17 is being moved towards its open position, the fluid by-pass 16 will be opened so that an increasing quantity of the fluid controlled will be by-passed around the main valve 10. As is well understood, the pressure differential across the main valve will be reduced by reason of this by-passing of the fluid. When this pressure differential has reached the desired value, the relay 30 will be operated to its closed position to complete an energizing circuit for the directional contactor 20 of the motor 12 which circuit may be traced from the upper conductor of the supply source 22, through the closed left hand contacts of the master switch 25, the conductor 31, the conductor 35, the closed relay 30, the conductor 36, the operating coil of the contactor 20, the conductor 37, the closed limit switch 26 and thence through the conductor 34 to the lower conductor of the supply source.

Thus, the motor 12 will be energized to open the main valve 10. It will be observed that as a result of this operation of the motor, the limit switch 27 will be operated to close its upper contact. This operation, however, will effect no resulting controlling action of the motors at this time since the circuit through this limit switch leads to the open right hand contacts of the master switch 25.

When the motor 18 has operated the valve 17 to its fully open position, the limit switch 28 will be opened to deenergize the directional contactor 23. Thus, the motor 18 will be deenergized when the valve 17 has been moved to the full open position. The motor 12, however, will continue to move the valve 10 to its open position until, when the valve has reached this position, the limit switch 26 will be opened to deenergize the directional contactor 20. Thus, the motor 12 will be deenergized when the valve 10 has been fully opened. It will be understood, however, that the motor 12 may be deenergized when the valve 10 has been opened to any desired degree since the switch 25 may be moved to its neutral position so as to deenergize both of the contactors 20 and 21. Should the valve be opened to some intermediate position and thereafter it be desired to fully open the valve, it is but necessary to again close the left hand contacts of the master switch 25.

When it is desired to close the valve 10, the master switch 25 will be moved to close its right hand contacts, in which position it is shown in the figure. In this position of the switch 25 an energizing circuit for the directional contactor 21 of the motor 12 will be completed from the upper conductor of the supply source 22, through the closed right hand contacts of the master switch 25, the conductor 40, the operating coil of the contactor 21, the conductor 41, the limit switch 27, which will have been moved to close its upper contact during the opening movement of the valve 10 and thence through the conductor 34 to the lower conductor of the supply source. As a result of this operation, the motor will be energized to close the valve 10. Upon the valve reaching its fully closed position, the limit switch 27 will be operated to open its upper contact and to close its lower contact, in which position it is shown in the drawing. Thus, when the valve 10 has been fully closed, the motor 12 will be deenergized while an energizing circuit for the directional contactor 24 of the motor 18 will be completed so that this motor will be energized to close the fluid by-pass valve 17. This energizing circuit may be traced from the upper conductor of the supply source 22, through the closed right hand contacts of the master switch 25, the conductor 40, the conductor 42, the limit switch 29 which will have been closed during the opening movement of the valve 17, the conductor 43, the energizing coil of the contactor 24, the conductor 44, the lower closed contact of the limit switch 27 and thence through the conductor 34 to the lower conductor of the supply source. Thus, the by-pass valve will be moved to its closed position. The system is thus left in a reset condition so that the master switch 25 again may be moved to its left hand position to effect an opening of the valve 10.

It will be observed that the pressure on the opposite sides of the valve 10 will be partially balanced before the motor 12 will be energized to open the valve. Thus, the frictional forces which would have been present by reason of a full differential in pressure will have been materially reduced so that the power required to open the valve will be greatly lessened. Thus, the motor 12 may be of relatively small size as compared with the motor which would be required with a full pressure differential across the valve. Of course, the pressure differential across the valve, likewise, will be very small in closing.

In those systems in which the direction of flow is always the same, it is unnecessary to employ a differential pressure relay to control the energization of the main motor. Thus, it is but necessary to provide a pressure relay for this purpose, the relay being responsive to the pressure in the main on the outlet side of the valve. Referring to Fig. 2, it will be observed that the pressure relay 50 will be provided to control the energization of the main motor. The operation of the system in which the pressure relay 50 is employed will be identical with that shown in Fig. 1. Thus in the valve opening operation when the pressure differential across the main valve has been reduced to the desired value by means of the fluid by-pass 16, the pressure relay 50 in response to the built up pressure on the outlet side of the valve will operate to energize the main valve motor so as to open this valve.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A system of fluid control for valves and the like comprising a motor for operating a valve, means for effecting a reduction in fluid pressure across the valve and means responsive to said reduction in pressure for controlling said motor.

2. The combination in a control system for valves and the like and a motor for operating a valve, of a fluid by-pass around the valve, means for controlling said by-pass to effect a reduction in the fluid pressure drop across the valve and means responsive to said reduction in fluid pressure drop for controlling said motor.

3. A system of control for a main fluid valve and an auxiliary fluid valve, said auxiliary valve being in a by-pass around said main valve comprising manually controlled means for operating said auxiliary valve to effect a reduction in fluid pressure across said main valve and means responsive to said reduction in fluid pressure and a separate motive means controlled thereby for operating said main valve.

4. A system of fluid control for valves and the like comprising a valve, means including a by-pass about said valve for effecting a reduction in the difference in pressure across said valve, an electric motor for operating said valve and means for controlling said motor comprising a relay responsive to said reduction in pressure condition.

5. An electrical control system for valves and the like comprising an electric motor for operating a main valve, a by-pass about said main valve, an auxiliary valve included in said by-pass, means for opening said auxiliary valve and effecting a reduction in fluid pressure across the main valve, means for controlling the energization of said first-mentioned motor to open said main valve comprising a relay responsive to said pressure reduction, and electrical connections providing closing operation of said valves in the reverse order.

6. A system of control for a main fluid valve and an auxiliary fluid valve, said auxiliary valve being in a fluid by-pass around said main valve comprising a main motor for operating said main valve, an auxiliary motor for operating said auxiliary valve, manually operated means for controlling said auxiliary motor to open said by-pass and thereby effect a change in fluid pressure on opposite sides of said main valve and means responsive to said change in fluid pressure for controlling said main motor to open said main valve.

7. A system of fluid control for valves and the like comprising a motor for operating a main valve, electro-responsive means for controlling said motor, a fluid by-pass around the valve, an auxiliary valve in said by-pass, a second electric motor for operating said auxiliary valve, means for energizing said second motor to open said auxiliary valves thereby to effect a reduction in the fluid pressure drop across the main valve, means comprising a pressure relay connected across the main valve for controlling said electro-responsive means so that said first motor is energized to open the main valve upon the occurrence of a predetermined pressure drop across the main valve, and electrical connections providing energization of said motors to close said valve in the reverse order.

8. The combination in a control system for valves and the like, of a valve, an electric motor for operating said valve, a fluid by-pass around said valve, a second valve for controlling said fluid by-pass, a second electric motor for operating said second valve so as to effect a variation in the fluid pressure drop across said first valve and means for controlling the energization of said motors comprising electro-responsive switching mechanism for each motor, a pressure differential relay across said first valve and electrical connections controlled by said electro-responsive switching mechanism and said differential relay whereby when said second motor is energized to open said by-pass said first motor is deenergized with its associated valve closed and whereby upon the occurrence of a predetermined pressure differential across said first valve said first motor is energized to open its valve.

9. The combination in a control system for valves and the like of a valve, an electric motor for operating said valve, a fluid by-pass around said valve, a second valve for controlling said by-pass, a second electric motor for operating said second valve, and means for controlling the energization of said motors comprising directional switching mechanism for each motor, a pressure differential relay across said first valve, electrical connections controlled by said directional switching mechanism and said differential relay whereby when said second motor is energized to open said by-pass said first motor is deenergized with its associated valve closed and whereby upon the occurrence of a predetermined pressure difference across said first valve its motor is energized so as to open it, and a limit switch operated by said first motor for controlling the switching mechanism of said second motor whereby upon said first valve being closed said second motor is energized to close said second valve.

10. The combination in a control system for valves and the like of a valve, an electric motor for operating the valve, a fluid by-pass around said valve, a second valve for controlling said fluid by-pass, a second motor for operating said second valve and means for controlling the energization of said motors comprising directional switches for each motor, a relay responsive to the pressure difference across said first valve, electrical connections controlled by said directional switches and said pressure relay so that said first motor is energized to open its valve upon the occurrence of a predetermined pressure difference effected by the operation of said second valve toward its open position and switching mechanism controlled by said first motor for effecting an energization of said second motor to close its valve upon said first valve being operated to its closed position.

11. A system of fluid control comprising a valve, an electric motor for operating said valve, a fluid by-pass around said valve, a second valve for controlling said by-pass, a second motor for controlling said second valve, directional switches for each motor, a master switch connected to control said directional switches, a pair of limit switches for each motor whereby the extent of movement of each valve is limited in either direction, a pressure differential relay across said first valve connected to effect an energization of said first motor to open its valve upon the occurrence of a predetermined pressure differential and connections controlled by the limit switch of said first motor operated in response to the movement of said first valve to its closed position for effecting an energization of said second motor to close its valve.

12. A control system for valves and the like comprising a main fluid valve, an auxiliary fluid valve, said auxiliary valve being in a by-pass around said main valve, an electric motor for operating said auxiliary valve, a second electric motor for operating said main valve, a manually operated switching device, electrical connections established in response to an operation of said switching device for energizing said first motor to open said auxiliary valve, a pressure operated relay responsive to the reduction in pressure across said main valve for energizing said second motor to open said main valve, and electrical connections controlled by another operation of said switching device providing energization of said motors in the reverse order to close said valves.

In witness whereof, I have hereunto set my hand this 2nd day of January, 1928.

HAROLD T. SEELEY.